United States Patent
Hamamura et al.

(10) Patent No.: US 8,457,413 B2
(45) Date of Patent: Jun. 4, 2013

(54) PATTERN RECOGNITION METHOD, CHARACTER RECOGNITION METHOD, PATTERN RECOGNITION APPARATUS, AND CHARACTER RECOGNITION APPARATUS

(75) Inventors: Tomoyuki Hamamura, Tokyo (JP); Toshio Sato, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 333 days.

(21) Appl. No.: 12/869,902

(22) Filed: Aug. 27, 2010

(65) Prior Publication Data
US 2011/0064316 A1 Mar. 17, 2011

(30) Foreign Application Priority Data
Sep. 16, 2009 (JP) .................. 2009-214811

(51) Int. Cl.
G06K 9/18 (2006.01)
G06K 9/00 (2006.01)
G06K 9/68 (2006.01)
G06K 7/10 (2006.01)

(52) U.S. Cl.
USPC ........... 382/219; 382/182; 382/185; 382/186; 382/187; 382/321

(58) Field of Classification Search
USPC .................. 382/182, 185–187, 219, 321
See application file for complete search history.

(56) References Cited

U.S. PATENT DOCUMENTS

| | | | | |
|---|---|---|---|---|
| 4,905,287 | A * | 2/1990 | Segawa ............. | 704/254 |
| 5,023,912 | A * | 6/1991 | Segawa ............. | 704/240 |
| 5,315,689 | A * | 5/1994 | Kanazawa et al. ... | 704/238 |
| 6,205,261 | B1 * | 3/2001 | Goldberg ........... | 382/310 |

FOREIGN PATENT DOCUMENTS

| | | |
|---|---|---|
| EP | 0 283 266 | 9/1988 |
| EP | 0 335 739 | 3/1989 |
| JP | 2739950 | 1/1998 |
| JP | 2001-335165 | 12/2001 |
| JP | 2008-280139 | 11/2008 |

OTHER PUBLICATIONS

European Search Report dated Nov. 24, 2010.
Segawa et al., "A Similarity-Value Transformation Method for Probabilistc Scoring", Toshiba Research and Development Center; Washington, IEEE 1988; vol. 2, Nov. 14, 1988, pp. 1225-1209.
Hamamura, Tomoyuki et al., "An Analytic Word. Recognition Algorithm Using a Posteriori Probabity"; Toshiba Corporation, Piscataway, NJ, IEEE 2007, Sep. 23, 2007, pp. 669-673.

(Continued)

*Primary Examiner* — Bhavesh Mehta
*Assistant Examiner* — Utpal Shah
(74) *Attorney, Agent, or Firm* — Pillsbury Winthrop Shaw Pittman, LLP

(57) ABSTRACT

According to one embodiment, a pattern recognition method includes calculating similarities of the input pattern with respect to respective categories, converting the calculated similarities of the input pattern with respect to the respective categories into first evaluation values based on a first table which indicates a relationship between similarities for respective categories and first evaluation values, calculating second evaluation values based on the calculated first evaluation values for the respective categories and prior probabilities for the respective categories stored in a second table indicating prior probabilities of the respective categories, and selecting a category corresponding to a maximum value of the calculated second evaluation values.

9 Claims, 5 Drawing Sheets

OTHER PUBLICATIONS

Ohya, Jun et al.; "A Relaxational Extracting Method for Character Recogniation in Scene Images"; Washington, IEEE 1988, Jun. 5, 1988, pp. 424-429.

Bozinovic, Radmilo M. et al.; "Off-Line Cursive Script Word Recognition"; IEEE Transactions on Pattern Analysis and Machine Intelligence, vol. 11, No. 1, Jan. 1989, pp. 68-83.

Kimura, Fumitaka et al.;. "Modified Quadractic Discriminatnt Functions and the Application to Chinese Character Recognition", IEEE Transactions on Pattern Analysis and Machine Intekligence, vol. PAMI-9, No. 1, Jan. 1987, pp. 149-153.

* cited by examiner

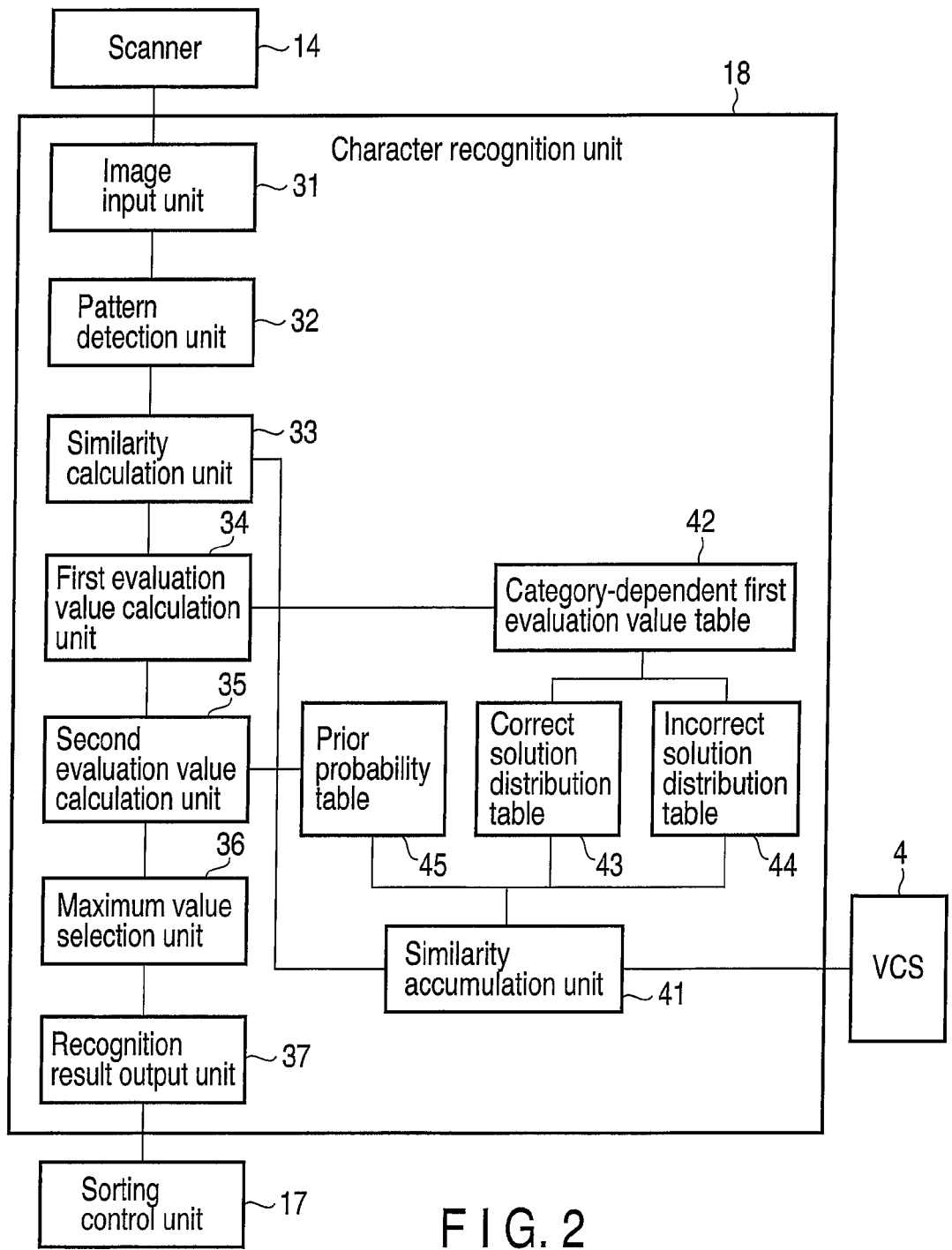
F I G. 2

| Category-dependent first evaluation value table | | | | | | 42 |
|---|---|---|---|---|---|---|
| Similarity / Category | 1000~900 | 900~800 | 800~700 | 700~600 | ... | |
| A | 322 | 95 | 2.36 | 0.21 | | |
| B | 510 | 31 | 0.98 | 0.023 | | |
| C | 210 | 65 | 5.01 | 0.82 | | |
| ... | | | | | | |

FIG. 4

| Correct solution distribution table | | | | | | 43 |
|---|---|---|---|---|---|---|
| Similarity / Category | 1000~900 | 900~800 | 800~700 | 700~600 | ... | Total |
| A | 310 | 3541 | 512 | 51 | | 4414 |
| B | 619 | 4167 | 209 | 18 | | 5013 |
| C | 298 | 2813 | 1293 | 137 | | 4541 |
| ... | | | | | | |

FIG. 5

| Incorrect solution distribution table | | | | | | |
|---|---|---|---|---|---|---|
| Similarity / Category | 1000~900 | 900~800 | 800~700 | 700~600 | ... | Total |
| A | 341 | 2886 | 13943 | 91552 | | 108722 |
| B | 146 | 1956 | 9612 | 75026 | | 86740 |
| C | 651 | 3300 | 19435 | 61946 | | 85332 |
| ... | | | | | | |

PATTERN RECOGNITION METHOD, CHARACTER RECOGNITION METHOD, PATTERN RECOGNITION APPARATUS, AND CHARACTER RECOGNITION APPARATUS

CROSS-REFERENCE TO RELATED APPLICATIONS

This application is based upon and claims the benefit of priority from Japanese Patent Application No. 2009-214811, filed Sep. 16, 2009; the entire contents of which are incorporated herein by reference.

FIELD

Embodiments described herein relate generally to a pattern recognition method, character recognition method, pattern recognition program, character recognition program, pattern recognition apparatus, and character recognition apparatus.

BACKGROUND

Conventionally, various pattern recognition methods have been proposed. For example, as a technique for recognizing a pattern including a plurality of categories, a pattern recognition method which improves recognition accuracy using a probability of correct solutions of the recognition results of respective categories is known. As an example of such pattern recognition method, IEEE Trans. Pattern Analysis and Machine Intelligence, vol. 11, No. 1, pp. 68-83, January 1989 (non-patent reference 1) discloses a method which defines a value obtained by dividing a posterior probability by a prior probability as an evaluation value, and selects a candidate which maximizes the evaluation value as a next search target. Note that the posterior probability is written as $P(c|x)$. The posterior probability $P(c|x)$ is defined to mean a probability that a candidate c is a correct solution under the condition of an output x obtained by recognition processing. The prior probability is written as $P(c)$. The prior probability $P(c)$ is defined to mean a probability that a candidate c is a correct solution in a stage before recognition processing.

As an attempt to convert similarities of respective categories into posterior probabilities, that disclosed by Japanese Patent Registration No. 2739950 is known. With the technique disclosed by Japanese Patent Registration No. 2739950, when a similarity sj of a certain category Cj is given, a posterior probability $P(Cj|sj)$ as the category Cj is to be calculated. However, it is difficult for the technique disclosed by Japanese Patent Registration No. 2739950 to improve the accuracy, since it considers only the similarity sj of one category, as described above.

BRIEF DESCRIPTION OF THE DRAWINGS

FIG. 2 is a block diagram showing an example of the arrangement of a character recognition unit;

FIG. 4 is a view showing a configuration example of a category-dependent first evaluation value table;

FIG. 5 is a view showing a configuration example of a correct solution distribution table; and FIG. 6 is a view showing a configuration example of an incorrect solution distribution table.

DETAILED DESCRIPTION

In general, according to one embodiment, a pattern recognition method includes calculating similarities of the input pattern with respect to respective categories, converting the calculated similarities of the input pattern with respect to the respective categories into first evaluation values based on a first table which indicates a relationship between similarities for respective categories and first evaluation values, calculating second evaluation values based on the calculated first evaluation values for the respective categories and prior probabilities for the respective categories stored in a second table indicating prior probabilities of the respective categories, and selecting a category corresponding to a maximum value of the calculated second evaluation values.

An embodiment will be described in detail hereinafter with reference to the drawings.

An overview of pattern recognition processing as this embodiment will be explained first.

The pattern recognition processing as this embodiment is processing for determining which of a plurality of categories an input pattern matches. A pattern to be recognized can be that for which a similarity (or a value indicating a probability of correct solution of a category, which is called a certainty factor, distance, evaluation value, or the like) with a dictionary pattern (category) registered in a recognition dictionary can be calculated. For example, as the pattern to be recognized, a character pattern in character recognition processing or a feature pattern of biological information in biometric authentication processing using biological information such as a face image is assumed.

For example, in OCR processing that recognizes character information described on a paper sheet, a character is recognized based on similarities between a character pattern detected from an input image and character patterns (dictionary data) registered in a dictionary database 19. In the pattern recognition processing such as the character recognition processing, which of a plurality of categories (dictionary data) an input pattern matches is determined based on similarities.

A pattern recognition method to be described in this embodiment is applied to recognition processing for determining which of a plurality of categories an input pattern matches. In the pattern recognition method to be described in this embodiment, similarities of each input pattern with respect to respective categories, and categories as correct solutions for input patterns are accumulated to calculate a posterior probability (to be described in detail later) under the conditions of the similarities of respective categories, thus efficiently and quickly obtaining a pattern recognition result with high accuracy.

As an application example of the pattern recognition processing, a sheet processing apparatus having a character recognition unit which recognizes characters of, e.g., address information described on a paper sheet will be described below.

Figure 1:
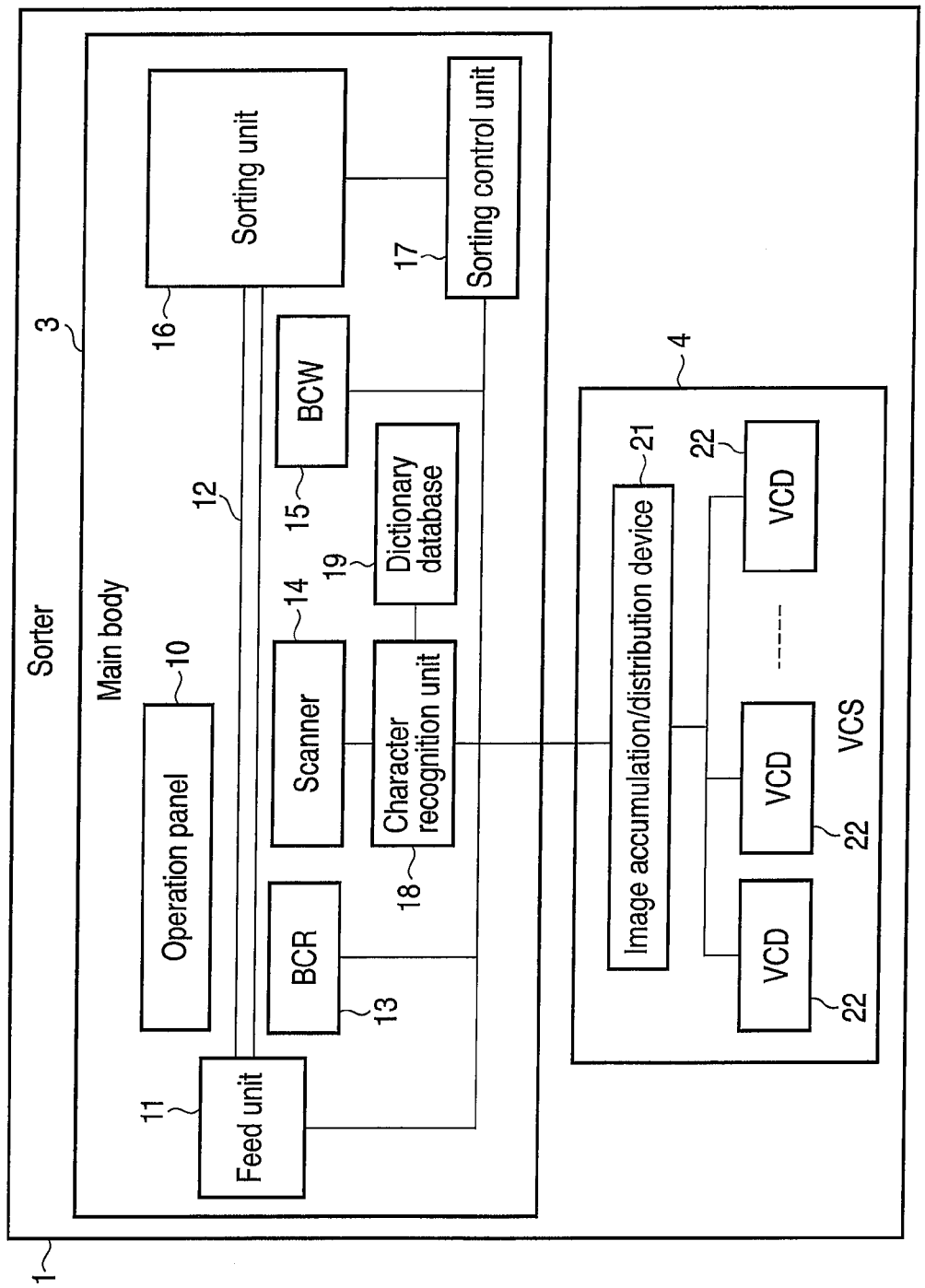
FIG. 1 is a schematic block diagram showing the arrangement of a sorter as a sheet processing apparatus according to an embodiment.

FIG. 1 is a schematic block diagram showing the arrangement of a sorter 1 as the sheet processing apparatus according to this embodiment.

This sorter 1 includes a sorter main body (main body) 3 and video coding system (VCS) 4, as shown in FIG. 1. The sorter main body 3 sorts paper sheets based on, e.g., address information. The VCS A inputs address information of a paper sheet, whose address information cannot be discriminated by the sorter main body 3, by a coding operation of an operator.

The sorter main body 3 has an operation panel 10 on its front surface, as shown in FIG. 1. The operation panel 10 allows an operator to designate a processing mode or start of processing, and displays, e.g., an operating state of the sorter.

The sorter main body 3 has a feed unit 11 which feeds paper sheets. Each of paper sheets stored in the feed unit 11 is described with character information such as a postal code, address, and name (simply referred to as address information hereinafter). The feed unit 11 feeds paper sheets one by one onto a main conveyance path 12 at predetermined intervals. Also, in addition to the address information, some of paper sheets fed by the feed unit 11 are described with destination barcodes indicating destination information of paper sheets or ID barcodes as identification information appended to paper sheets, character recognition of which has failed.

Along the main conveyance path 12, a barcode reader (BCR) 13, scanner 14, barcode writer (BCW) 15, and sorting unit 16 are arranged. These units operate under the control of a sorting control unit 17 according to processing statuses such as conveyance states of respective paper sheets.

The BCR 13 reads a barcode such as an ID barcode or destination barcode printed on each paper sheet conveyed on the main conveyance path 12. The BCR 13 includes a reading unit which reads an image of a barcode and a recognition unit which recognizes the barcode in the read image. The barcode recognition result of the BCR 13 is supplied to the sorting control unit 17.

The scanner 14 reads an image of each paper sheet on the main conveyance path 12. The scanner 14 optically reads an image on each paper sheet. The scanner 14 is connected to a character recognition unit 18. The character recognition unit 18 recognizes address information from the image read by the scanner 14 with reference to dictionary data registered in a dictionary database 19. The character recognition unit 18 supplies the recognition result of the address information to the sorting control unit 17. That is, the scanner 14, character recognition unit 18, and dictionary database 19 configure an optical character recognition (OCR) apparatus. Note that the arrangement of the character recognition unit 18 will be described in detail later.

The BCW 15 prints an ID barcode or destination barcode on a paper sheet as needed. For example, the BCW 15 prints a destination barcode obtained by converting address information as the recognition result into a barcode on a paper sheet whose address information can be recognized by the character recognition unit 18. Also, the BCW 15 prints an ID barcode obtained by converting, into a barcode, identification information (letter ID) supplied from the sorting control unit 17 on a paper sheet whose destination information cannot be recognized by the character recognition unit 18. That is, the BCW 15 prints the recognition result as a destination barcode on a paper sheet whose address information can be recognized, and prints an ID barcode on a paper sheet whose address information cannot be recognized.

That is, the destination barcode is a barcode indicating destination information itself as the OCR recognition result, and the ID barcode is a barcode indicating identification information used to identify the corresponding paper sheet. The identification information of the paper sheet indicated by the ID barcode is information used to associate destination input by keying in the VCS 4 with the paper sheet. In other words, paper sheets on which the ID barcodes are printed are those which are to be processed by the VCS 4.

On the downstream side of the paper sheet conveyance direction of the BCW 15, the sorting unit 16 which sorts paper sheets according to their address information is arranged. This sorting unit 16 includes a plurality of sorting pockets (not shown) partitioned into a plurality of stages and a plurality of columns. The respective pockets are set in correspondence with destinations, and paper sheets are sequentially accumulated in the pockets corresponding to their address information based on the address information or machine codes. The sorting unit 16 also includes a VCS rejection pocket (not shown) in which paper sheets whose destinations cannot be recognized are accumulated. Paper sheets accumulated in the VCS rejection pocket are re-fed to the feed unit 11 after address information is input by the VCS 4, and are re-sorted based on the ID codes and the address information input by the VCS 4 of the paper sheets.

The VCS 4 will be described below.

The VCS 4 includes an image accumulation/distribution device 21 and a plurality of video coding terminals (referred to as VCDs hereinafter) 22.

The image accumulation/distribution device 21 executes processing for delivering an image of each paper sheet whose address information cannot be recognized by the sorter main body 3 to each VCD 22, and returning a key entry result of address information by that VCD 22 to the sorter main body 3. To the image accumulation/distribution device 21, the scanner 14, sorting control unit 17, and character recognition unit 18 in the sorter main body 3 are connected. The image accumulation/distribution device 21 includes, for example, a personal computer (PC) having an image control unit and storage unit. The image accumulation/distribution device 21 stores an image of a paper sheet whose address information cannot be recognized by the character recognition unit 18 in association with identification information (letter ID) of that paper sheet, and delivers the stored image of the paper sheet to each VCD 22.

Each VCD 22 has a display (display unit), keyboard (operation unit), and the like. The VCD 22 includes, for example, a PC. The VCD 22 displays an image of a paper sheet distributed from the image accumulation/distribution device 21 on the display. While the image of the paper sheet is displayed, an operator inputs address information using the keyboard at the VCD 22. The input result by each VCD 22 is returned to the image accumulation/distribution device 21 in association with the identification information (ID code) of that paper sheet. The image accumulation/distribution device 21 supplies the input result from each VCD 22 to the sorting control unit 17 in association with the identification information (ID code) of that paper sheet. Then, the sorting control unit 17 obtains address information input by keying based on the ID barcode appended to a paper sheet.

The character recognition unit 18 will be described below.

FIG. 2 is a block diagram showing an example of the arrangement of the character recognition unit 18.

As shown in FIG. 2, the character recognition unit 18 includes an image input unit 31, pattern detection unit 32, similarity calculation unit 33, first evaluation value calculation unit 34, second evaluation value calculation unit 35, maximum value selection unit 36, recognition result output unit 37, similarity accumulation unit 41, category-dependent first evaluation value table 42, correct solution distribution table 43, incorrect solution distribution table 44, and prior probability table 45. The character recognition unit 18 includes hardware (processing circuit board) having a control unit, storage unit, input/output interface, and the like. That is, the character recognition unit 18 has the same arrangement as a computer which implements various processing functions when the control unit executes programs stored in the storage unit.

For example, the image input unit 31, pattern detection unit 32, similarity calculation unit 33, first evaluation value calculation unit 34, second evaluation value calculation unit 35, maximum value selection unit 36, and recognition result output unit 37 are functions implemented when the control unit of the computer (processing circuit board) executes various programs. Also, the similarity accumulation unit 41, category-dependent first evaluation value table 42, correct solution distribution table 43, incorrect solution distribution table 44, prior probability table 45, and the like are implemented by the storage unit of the computer (processing circuit board). Assume that the character recognition unit 18 of this embodiment implements the functions of the respective units by executing a pattern recognition program. Alternatively, some or all of the aforementioned units of the character recognition unit 18 may be implemented by hardware.

The image input unit 31 is an interface used to input an image which is to undergo character recognition. The image input unit 31 inputs image data of a paper sheet read by the scanner 14. The pattern detection unit 32 detects candidates of input patterns (character patterns to be recognized) from the input image. The pattern detection unit 32 detects pattern (word) candidates of respective categories (layers). The pattern detection unit 32 extracts an address region where address information is probably described from the input image, extracts a character line from the address region, extracts characters from the character line, and detects patterns of the extracted characters as input character patterns.

The similarity calculation unit 33 calculates similarities between each input pattern obtained from the input image and respective categories. The similarity calculation unit 33 calculates similarities between each input pattern (input character pattern) selected by the pattern detection unit 32 and characters (dictionary character patterns) as respective categories registered in the dictionary database 19. The similarity calculation unit 33 accumulates the calculated similarities for the respective categories in the similarity accumulation unit 41.

The first evaluation value calculation unit 34 calculates first evaluation values for respective categories. In this case, the first evaluation value calculation unit 34 converts similarities of each input character pattern with respect to respective categories (dictionary character patterns), which are calculated by the similarity calculation unit 33, into first evaluation values with reference to the category-dependent first evaluation value table 42.

The second evaluation value calculation unit 35 calculates second evaluation values for respective categories. In this case, the second evaluation value calculation unit 35 calculates second evaluation values for respective categories by multiplying prior probabilities for the respective categories (dictionary character patterns) obtained from the prior probability table 45 by the first evaluation values for the respective categories obtained by the first evaluation value calculation unit 34.

The maximum value selection unit 36 selects a maximum second evaluation value of the second evaluation values for the respective categories, which are calculated by the second evaluation value calculation unit 35. The maximum value selection unit 36 selects a dictionary character pattern as a category corresponding to a maximum value of the second evaluation values. In this case, a character (dictionary character pattern) corresponding to the maximum value of the second evaluation values is obtained as a character recognition result for the input character pattern.

The recognition result output unit 37 outputs the recognition result of address information as the character recognition unit 18. In this case, the recognition result output unit 37 outputs the recognition result of address information for a paper sheet by totally evaluating respective characters selected by the maximum value selection unit 36. The character recognition unit 18 recognizes the address information used in sorting processing of paper sheets. For this reason, the recognition result output unit 37 may determine whether or not the characters selected by the maximum value selection unit 36 can be adopted as address information required to correctly sort the paper sheet. For example, the recognition result output unit 37 may determine whether or not the recognition result can be adopted as a correct recognition result by seeing if each second evaluation value for a category selected as the maximum value by the maximum value selection unit 36 is greater than or equal to a predetermined threshold. Alternatively, the recognition result output unit 37 may determine whether or not the recognition result can be adopted as a correct recognition result by seeing if each similarity for a category selected as the maximum value by the maximum value selection unit 36 is greater than or equal to a predetermined threshold.

The similarity accumulation unit 41 stores similarities for respective categories, which are calculated by the similarity calculation unit 33, in association with the identification information of each paper sheet, and also accumulates information input by keying by the VCS 4 as categories of correct solutions (correct address information) in association with the identification information of each paper sheet. Information accumulated in the similarity accumulation unit 41 is used to build the correct solution distribution table 43, incorrect solution distribution table 44, and prior probability table 45.

Figure 3:
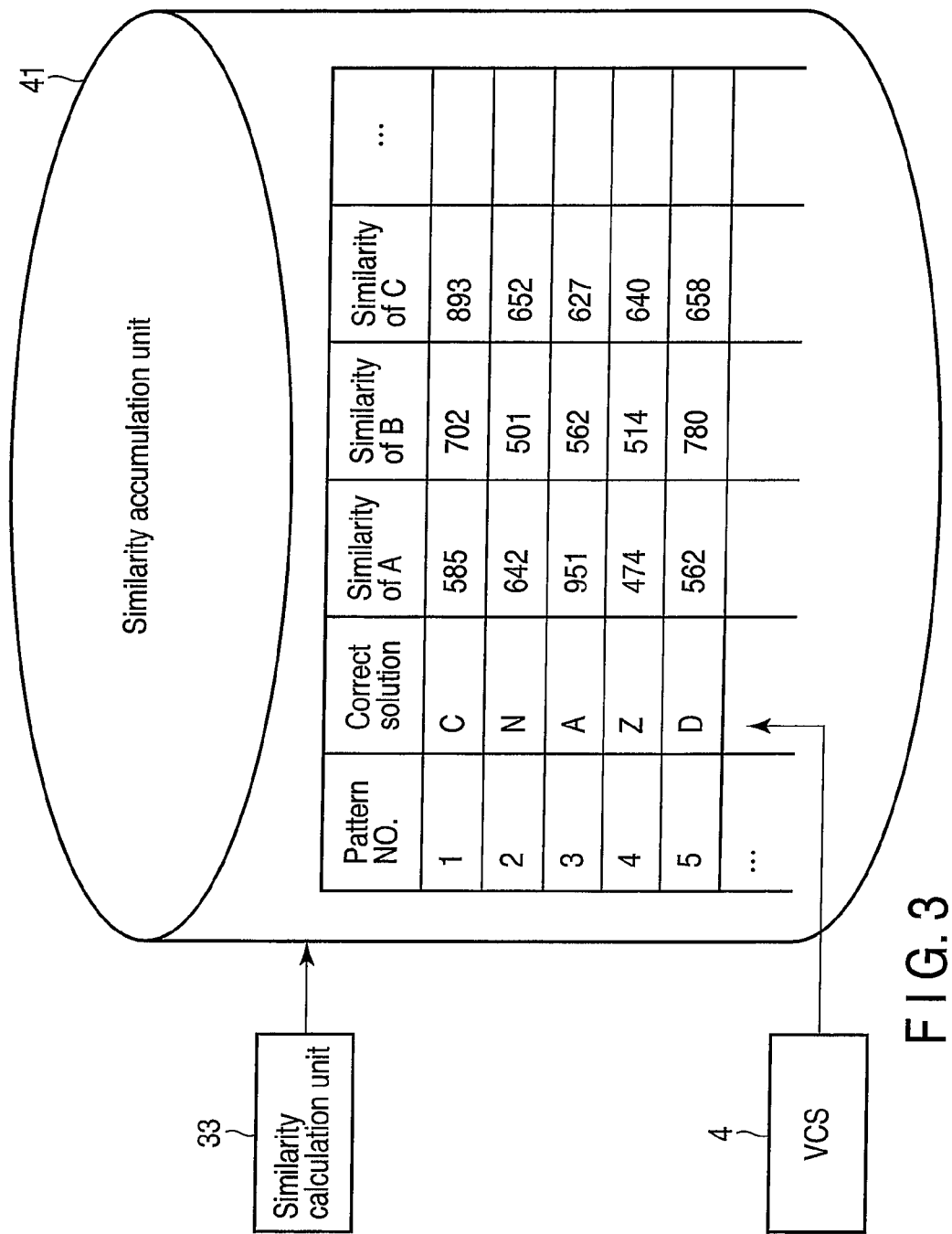
FIG. 3 is a view showing an example of the configuration of a similarity accumulation unit.

FIG. 3 is a view showing a configuration example of the similarity accumulation unit 41.

In the example shown in FIG. 3, the similarity accumulation unit 41 stores information indicating a category of a correct solution, and pieces of information indicating similarities of respective categories (dictionary patterns) in correspondence with each input pattern identified by a pattern number. The similarities of the respective categories with respect to each input pattern are values calculated by the aforementioned similarity calculation unit 33. Therefore, every time the similarity calculation unit 33 calculates similarities of respective categories (dictionary patterns) with respect to a certain input pattern, the similarity accumulation unit 41 accumulates pieces of information indicating the similarities of the respective categories with respect to that input pattern. Furthermore, the similarity accumulation unit 41 accumulates information indicating a category of a correct solution with respect to the input pattern.

In the sorter 1, information (VCS information) input by an operator at the VCS 4 indicates a category of a correct solution with respect to an input pattern. In this case, information indicating a category of a correct solution is further accumulated for an input pattern corresponding to similarities of respective categories. That is, in the aforementioned sorter 1, address information of each paper sheet is input by keying by the VCS 4 after the processing for paper sheets in the sorter main body 3 including the recognition processing by the character recognition unit 18. For this reason, in the similarity accumulation unit 41, similarities of respective categories with respect to each input pattern are registered at the time of the character recognition processing (paper sheet processing in the sorter main body 3) by the character recognition unit 18, and a category of a correct solution for that input pattern identified by a pattern number is registered at the time of VCS processing (key entry processing by the VCS 4).

For example, the example shown in FIG. 3 indicates that as similarities of respective categories calculated by the similarity calculation unit 33, a similarity of category A is "585", that of category B is "702", and that of category C is "893", and a category of a correct solution settled by the VCS 4 is a category "C" with respect to an input pattern of a pattern number "1".

According to the aforementioned similarity accumulation unit 41, similarities of respective categories obtained at the time of the character recognition processing, and a category of a correct solution settled by the VCS can be easily extracted for each input pattern.

The category-dependent first evaluation value table 42 is a table showing the relationship between similarities of respective categories and first evaluation values. Values stored in the category-dependent first evaluation value table 42 are calculated based on information stored in the correct solution distribution table 43 and incorrect solution distribution table 44. Note that the first evaluation values correspond to R(Sc|c) and R(Sc'|c') in formula (13) to be described later.

FIG. 4 is a view showing a configuration example of the category-dependent first evaluation value table 42. The configuration example shown in FIG. 4 shows frequencies obtained by dividing similarities in decrements of 100. However, the embodiment is not limited to this. For example, the category-dependent first evaluation value table 42 may show frequencies by dividing similarities by arbitrary ranges. The example shown in FIG. 4 indicates that, for example, for category A, a first evaluation value when a similarity falls within a range from 1000 to 900 is "322", that when a similarity falls within a range from 900 to 800 is "95", that when a similarity falls within a range from 800 to 700 is "2.36", and that when a similarity falls within a range from 700 to 600 is "0.21".

The correct solution distribution table 43 is a table indicating similarity distributions with respect to categories as correct solutions. The correct solution distribution table 43 stores data obtained by counting the similarities of input patterns with respect to categories as correct solutions. For example, the correct solution distribution table 43 is built as a table indicating frequency values of similarities with respect to patterns as correct solutions for respective categories by reading out similarities of respective categories as correct solutions from the similarity accumulation unit 41, and counting the readout similarities for respective categories. Note that a frequency value of similarities as a correct solution corresponds to P(Sc|c) in formula (13) to be described later, and a value obtained by dividing a frequency value by a total value is the same as P(Sc|c).

FIG. 5 shows a configuration example of the correct solution distribution table 43. The configuration example shown in FIG. 5 shows frequencies obtained by dividing similarities in decrements of 100. However, the embodiment is not limited to this. For example, the table 43 may show frequencies by dividing similarities by arbitrary ranges. The example shown in FIG. 5 indicates that, for example, for category A, the total number of correct solutions is "4414", a frequency value when a similarity falls within a range from 1000 to 900 is "310", that when a similarity falls within a range from 900 to 800 is "3541", that when a similarity falls within a range from 800 to 700 is "512", and that when a similarity falls within a range from 700 to 600 is "51".

The incorrect solution table 44 is a table indicating similarity distributions with respect to categories as incorrect solutions. The incorrect solution table 44 stores data obtained by counting similarities of input patterns with respect to categories as incorrect solutions. For example, the incorrect solution distribution table 44 is built as a table indicating frequency values of similarities with respect to patterns as incorrect solutions for respective categories by reading out similarities of respective categories as incorrect solutions from the similarity accumulation unit 41, and counting the readout similarities for respective categories. Note that a frequency value of similarities as an incorrect solution corresponds to P(Sc|complementary set of c) in formula (13) to be described later, and a value obtained by dividing a frequency value by a total value is the same as P(Sc|complementary set of c).

FIG. 6 is a view showing a configuration example of the incorrect solution distribution table 44. The configuration example shown in FIG. 6 shows frequencies obtained by dividing similarities in decrements of 100. However, the embodiment is not limited to this. For example, the table 44 may show frequencies by dividing similarities by arbitrary ranges. The example shown in FIG. 6 indicates that, for example, for category A, the total number of incorrect solutions is "108722", a frequency value when a similarity falls within a range from 1000 to 900 is "341", that when a similarity falls within a range from 900 to 800 is "2886", that when a similarity falls within a range from 800 to 700 is "13943", and that when a similarity falls within a range from 700 to 600 is "91552".

Data stored in the correct solution distribution table 43 are frequency values of similarities with respect to correct solution categories of input patterns. For this reason, based on the data stored in the correct solution distribution table, a first probability that a similarity for category c is Sc under the condition that a correct solution of an input pattern is category c (this probability is written as P(Sc|c)) can be calculated.

Data stored in the incorrect solution distribution table 44 are frequency values of similarities with respect to categories which are not correct solution categories of input patterns. For this reason, based on the data stored in the incorrect solution distribution table, a second probability (this is written as P(Sc|complementary set of c)) that a similarity for category c is Sc under the condition that a correct solution of an input pattern is not category c (which is an incorrect solution) can be calculated.

Data stored in the category-dependent first evaluation value table 42 are first evaluation values for similarities of respective categories. The first evaluation value corresponds to R(Sc|c) or R(Sc'|c') in formula (13) to be described later, and is calculated as a ratio between the first probability P(Sc|c) and second probability P(Sc|complementary set of c). That is, data (first evaluation values) stored in the category-dependent first evaluation value table 42 can be calculated from the correct solution distribution table 43 and incorrect solution table 44.

The prior probability table 45 is a table indicating prior probabilities of respective categories. That is, the prior probability table 45 stores prior probabilities for respective categories.

According to the aforementioned pattern recognition processing, similarities of an input pattern with respect to respective categories can be evaluated based on frequencies of similarities as correct solutions and those of similarities as incorrect solutions in respective categories, thus realizing pattern recognition with high accuracy. Furthermore, similarities of input patterns with respect to respective categories and pieces of information indicating categories of correct solutions for input patterns are accumulated, and the frequencies of similarities as correct solutions and those of similarities as incorrect solutions for respective categories can be updated based on the pieces of accumulated information, thus easily implementing a function of learning data required to evaluate respective similarities.

The aforementioned posterior probability will be described in detail below.

In general, a posterior probability is calculated using the Bayes' theorem as follows:

$$P(c \mid x) = \frac{P(x \mid c)P(c)}{P(x)} \quad (1)$$

$$= \frac{P(x \mid c)P(c)}{\sum_{c' \in C} P(x \mid c')P(c')} \quad (2)$$

where C is a set of all categories (all data of a dictionary) (for example, in case of a numeral dictionary, C={1, 2, 3, . . . }, in case of alphabets, C={A, B, C, . . . }, in case of face recognition, C={Mr. A, Mr. B, Mr. C, . . . }). In case of a method which attempts to express a pattern distribution by a probability density function (for example, see a modified Bayes' discriminate function; [F. Kimura, K. Takashina, S. Tsuruoka, and Y. Miyake, "Modified quadratic discriminate functions and the application to Chinese character recognition", IEEE Trans. Pattern Analysis and Machine Intelligence, vol. 9, No. 1, pp. 149-153, 1987], etc.), since a likelihood P(x|c') when x is a feature vector is obtained, the posterior probability can be obtained by formula (2) using this.

However, in a subspace method, a similarity of each category is calculated, but a likelihood cannot be calculated. Hence, an examination will be made as follows.

Let x be all recognition results, i.e., a set of similarities of all categories (for example, x=(a similarity "800" of A, a similarity "750" of B, . . . )). A posterior probability P(c|x) of category c included in the set C of all categories is to be calculated. Assume that mathematical formulas and those including practical values alternately appear for the sake of easy understanding. A practical example is character recognition of alphabets, and assume that c is an alphabet "B". Also, assume that the recognition result is x=(a similarity "800" of A, a similarity "750" of B, a similarity "900" of C, . . . ) Furthermore, this expression is abbreviated as x=(A800, B750, C900, . . . )

$$P(c \mid x) \quad (3)$$

$$= P(B \mid A800, B750, C900, ...) \quad (4)$$

$$= \frac{P(x \mid c)P(c)}{\sum_{c' \in C} P(x \mid c')P(c')} \quad (5)$$

$$= \frac{P(A800, B750, C900, ... \mid B)P(B)}{P(A800, B750, C900, ... \mid A)P(A) + P(A800, B750, C900, ... \mid B)P(B) + ...} \quad (6)$$

In this case, a likelihood P(A800, B750, C900, . . . |B) cannot be calculated. For this reason, decomposition into products will be examined. If the likelihood is simply decomposed into products, errors are large. Hence, let Kc be an error, and the likelihood is decomposed as P(A800, B750, C900, . . . |B)=KB·P(A800|B, B750|B)P(C900|B), . . . . Then, errors for each category c are approximate as the same value K.

$$P(c \mid x) \approx \frac{K \cdot \left\{ \prod_{c'' \in C} P(s_{C''} \mid c) \right\} P(c)}{\sum_{c' \in C} K \cdot \left\{ \prod_{c'' \in C} P(s_{C''} \mid c') \right\} P(c')}$$

(where $s_{C''}$ is a similarity value of category $c''$) (7)

$$= \frac{K \cdot P(A800 \mid B)P(B750 \mid B)P(C900 \mid B) \ldots P(B)}{K \cdot P(A800 \mid A)P(B750 \mid A)P(C900 \mid A) \ldots P(A) + K \cdot P(A800 \mid B)P(B750 \mid B)P(C900 \mid B) \ldots P(B) + \ldots} \quad (8)$$

$$\approx \frac{\left\{ \prod_{c'' \in C, c'' \neq c} P(s_{C''} \mid \overline{c''}) \right\} P(s_C \mid c)P(c)}{\sum_{c' \in C} \left\{ \prod_{c'' \in C, c'' \neq c'} P(s_{C''} \mid \overline{c''}) \right\} P(s'_C \mid c')P(c')} \quad (9)$$

(where $\overline{c''}$ indicates all categories except category $c''$) (10)

$$\approx \frac{P(A800 \mid \text{except } A)P(B750 \mid B)P(C900 \mid \text{except } C) \ldots P(B)}{P(A800 \mid A)P(B750 \mid \text{except } B)P(C900 \mid \text{except } C) \ldots P(A) + P(A800 \mid \text{except } A)P(B750 \mid B)P(C900 \mid \text{except } C) \ldots P(B) + \ldots} \quad (11)$$

$$= \frac{\frac{P(s_C \mid c)}{P(s_C \mid \overline{c})} P(c)}{\sum_{c' \in C} \frac{P(s_{C'} \mid c')}{P(s_{C'} \mid \overline{c'})} P(c')} \quad (12)$$

$$= \frac{\frac{P(B750 \mid B)}{P(B750 \mid \text{except } B)} P(B)}{\frac{P(A800 \mid A)}{P(A800 \mid \text{except } A)} P(A) + \frac{P(B750 \mid B)}{P(B750 \mid \text{except } B)} P(B) + \ldots} \quad (13)$$

$$= \frac{R(s_C \mid c)P(c)}{\sum_{c' \in C} R(s_{C'} \mid c')P(c')} \text{ (for } R(s_C \mid c) = P(s_C \mid c)/P(s_C \mid \overline{c})) \quad (14)$$

$$= \frac{R(B750 \mid B)P(B)}{R(A800 \mid A)P(A) + R(B750 \mid B)P(B) + \ldots}$$

For example, in formula (12), P(B) in the numerator represents a prior probability, P(B750|B) in the numerator represents a first probability (a probability that the category becomes a correct solution at that similarity), P(B750|except B) in the numerator represents a second probability (a probability that the category becomes an incorrect solution (not a correct solution) at that similarity), and a value obtained by dividing the first probability P(B750|B) by the second probability P(B750|except B) indicates a first evaluation value (a first evaluation value for that category).

That is, the posterior probability can be calculated using formula (13). Formula (13) has the same form as formula (2), and a likelihood part in formula (2) is replaced by R(Sc|c). That is, as can be seen from the above description, R( ) is a value proportional to a likelihood. Although a likelihood itself is not calculated, its ratio is calculated as R( ).

As described above, in this pattern recognition processing, similarities of an input pattern with respect to a plurality of categories registered in a recognition dictionary are calculated, the calculated similarities are converted into first evaluation values obtained from probabilities of the similarities under the condition of correct solutions and those of the similarities under the condition of not correct solutions, second evaluation values are calculated from the first evaluation values and prior probabilities, and a category corresponding to a maximum second evaluation value is selected. Thus, a recognition result can be determined using values obtained by evaluating similarities based on previous recognition results, and pattern recognition with high accuracy can be efficiently implemented.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A pattern recognition method for identifying which category of a plurality of categories an input pattern matches, the method comprising:
   calculating similarities of the input pattern with respect to respective categories;
   converting the calculated similarities of the input pattern with respect to the respective categories into first evaluation values based on a first table which stores first evaluation values for similarities of respective categories, the first evaluation values being calculated from correct distribution information and incorrect distribution information;
   calculating second evaluation values based on the calculated first evaluation values for the respective categories and prior probabilities for the respective categories stored in a second table indicating prior probabilities of the respective categories; and
   selecting a category corresponding to a maximum value of the calculated second evaluation values.

2. The method according to claim 1, wherein the categories are characters.

3. The method according to claim 2, wherein the first table stores a ratio between a probability of the similarity under a condition that the input pattern matches the character and a probability of the similarity under a condition that the input pattern does not match the character.

4. The method according to claim 2, which further comprises:
   accumulating the calculated similarities of the respective characters and information indicating a character as a correct solution for the input pattern in association with each other, and in which the first table is updated based on the accumulated information.

5. The method according to claim 3, which further comprises:
   accumulating the calculated similarities of the respective characters and information indicating a character as a correct solution for the input pattern in association with each other, and in which the first table is updated based on the accumulated information.

6. A non-transitory computer readable medium containing program instructions for:
   performing a similarity calculation function of calculating similarities of an input pattern with respect to respective categories;
   performing a first evaluation value calculation function of converting the similarities of the input pattern with respect to the respective categories, which are calculated by the similarity calculation function, into first evaluation values based on a first table which stores first evaluation values for similarities of respective categories the first evaluation values being calculated from correct distribution information and incorrect distribution information;
   performing a second evaluation value calculation function of calculating second evaluation values based on the first evaluation values for the respective categories, which are obtained by the first evaluation value calculation function, and prior probabilities for the respective categories stored in a second table indicating prior probabilities of the respective categories; and
   performing a maximum value selection function of selecting a category corresponding to a maximum value of the second evaluation values which are calculated by the second evaluation value calculation function.

7. The medium according to claim 6, wherein the categories are characters.

8. A pattern recognition apparatus for identifying which category of a plurality of categories an input pattern matches, the apparatus comprising:
   a similarity calculation unit configured to calculate similarities of the input pattern with respect to respective categories;
   a first table configured to store first evaluation values for similarities of respective categories, the first evaluation values being calculated from correct distribution information and incorrect distribution information;
   a first evaluation value calculation unit configured to convert the similarities of the input pattern with respect to the respective categories, which are calculated by the similarity calculation unit, into first evaluation values based on the relationship indicated by the first table;
   a second evaluation value calculation unit configured to calculate second evaluation values based on the first evaluation values for the respective categories, which are obtained by the first evaluation value calculation unit, and prior probabilities for the respective categories stored in a second table indicating prior probabilities of the respective categories; and
   a maximum value selection unit configured to select a category corresponding to a maximum value of the second evaluation values, which are calculated by the second evaluation value calculation unit.

9. The apparatus according to claim 8, wherein the categories are characters.

* * * * *